No. 885,246. PATENTED APR. 21, 1908.
H. T. HALL.
ELECTRIC FIXTURE.
APPLICATION FILED AUG. 19, 1907.
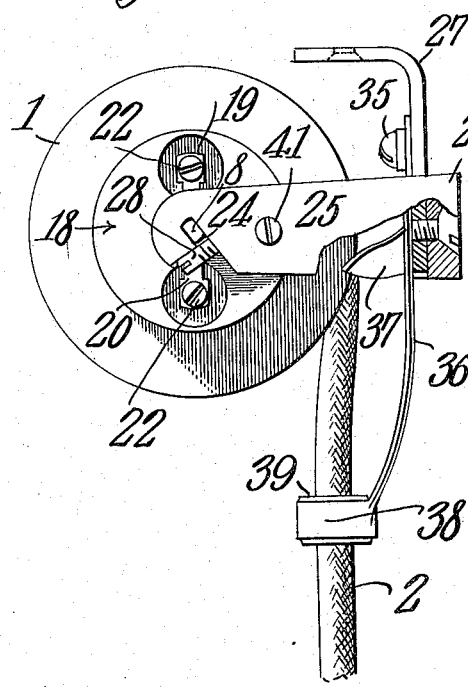
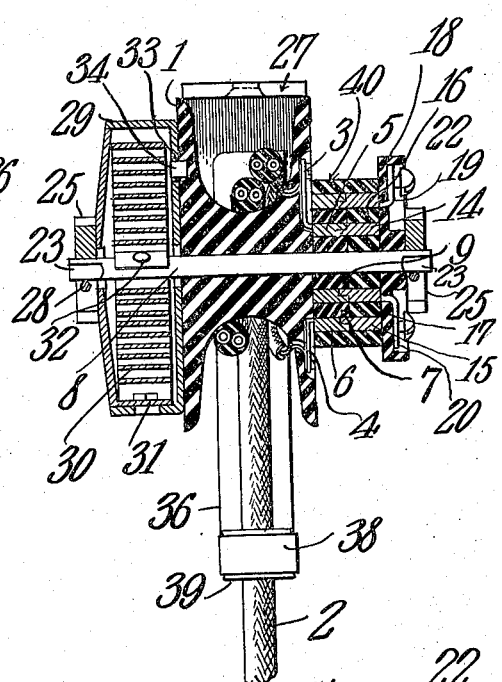
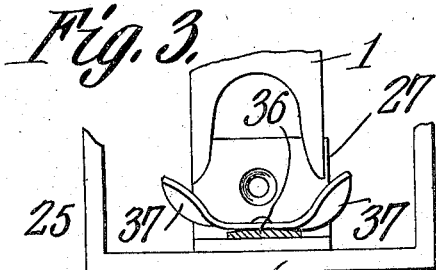
Harry T. Hall,
Inventor.
Witnesses

UNITED STATES PATENT OFFICE.

HARRY TOOMEY HALL, OF GREENVILLE, OHIO.

ELECTRIC FIXTURE.

No. 885,246.　　　Specification of Letters Patent.　　　Patented April 21, 1908.

Application filed August 19, 1907. Serial No. 389,227.

*To all whom it may concern:*

Be it known that I, HARRY TOOMEY HALL, a citizen of the United States, residing at Greenville, in the county of Darke and State of Ohio, have invented a new and useful Electric Fixture, of which the following is a specification.

This invention has reference to improvements in electric fixtures, being intended more particularly for use in connection with portable translating devices such as electric lamps or electric fans or household utensils, or, in fact, any portable electric structure, and its object is to provide a simple means whereby the slack of a flexible conductor may be always taken up automatically when the translating device is moved from point to point, but at the same time the conductor may be unreeled from the fixture when it is desired to move the translating device farther away from the same.

The invention comprises a suitable reel for the flexible conductor, which reel carries collecting rings forming terminals to which the ends of the flexible conductor are connected, and these collecting rings, which are rotatable with the reel, are engaged by other collecting rings interlocking with the first-named rings but fixed with relation thereto and forming the terminals of the power circuit feeding the translating device. In order that the reel may constantly tend to take up any slack that may occur in the flexible conductor, there is provided a spring carried by the reel and connected thereto at one end, while the other end of the spring is connected to a fixed support upon which the reel is mounted. For the purpose of adjusting the tension of the spring at will, the spring case is so connected to the reel that it may be moved out of connection therewith and turned in the proper direction to increase or decrease the tension of the spring, as the case may be, after which it may again be locked to the reel to rotate therewith. Furthermore, there is provided a guide for the flexible conductor, so that the latter is constrained to wind up on the reel without danger of escaping from the side flanges thereof.

The invention will be fully understood from the following detailed description, taken in connection with the accompanying drawings forming part of this specification, in which,—

Figure 1 is a side elevation of the improved fixture, with parts broken away and other parts shown in section; Fig. 2 is an axial section through the reel and parts coacting therewith; Fig. 3 is a detail view showing a portion of the guide for the flexible conductor; and Fig. 4 is a detail section of the collecting rings, partially disassembled.

Referring to the drawings, there is shown a reel 1 which may be formed of wood, or fiber, or hard rubber, or porcelain or any other suitable material adapted to receive a flexible conductor 2 which is shown as of the double conductor type commonly used in house wiring. The terminals of the flexible conductor 2 are connected to plates 3—4 countersunk in one face of the reel. The plate 3 is connected to a metal ring 5 concentric with the axis of the reel, and the plate 4 is connected with another ring 6 exterior to the ring 5 and separated therefrom by an insulating ring 7. The reel is mounted upon a fixed shaft 8, to be hereinafter referred to, and between the ring 5 and this shaft is a ring 9 of insulating material. The outer edge of each ring 5 and 6 is formed with an annular rabbet 10 and 11 respectively, and fitting the rabbets of these rings 5 and 6 are rabbets 12 and 13 of rings 14 and 15 respectively, insulated one from the other by sleeves 16 and 17 of insulating material. The rings 14 and 15 with their insulating sleeves are mounted upon a disk 18, also of insulating material, and are secured thereto by plates 19—20 seated in recesses 21 formed in the outer face of the disk 18 and there receiving binding screws 22 which are designed to receive the terminals of conductors coming from the power circuit.

The ends of the shaft 8 are flattened, as shown at 23, and enter rectangular sockets 24 formed in the ends of arms 25 projecting from a base plate 26 fast to a bracket 27 by means of which the structure may be secured to a ceiling or wall or any other fixed point. When the shaft 8 is seated in the sockets 24 set-screws 28 serve to maintain the shaft in said sockets.

Mounted upon the shaft is a cylindrical spring case 29 within which is housed a spiral spring 30, one end being fast to the case, as indicated at 31, and the other end being fast to the shaft 8, as indicated at 32. This spring case is confined between one of the arms 25 and the corresponding face of the reel 1, and the spring case is provided with a perforation 33 receiving a pin 34 fast on the contiguous face of the reel 1. The spring case 29 is made somewhat elastic so that it may be moved away from contact with the contiguous face of the reel 1 in order to release it from the pin 34. It may then be turned upon the shaft 8 sufficiently to put the spring under the desired tension, after which it may be allowed to again snap back into locking relation with the pin 34. The tension of the spring may be adjusted from time to time as desired by simply releasing the spring case from engagement with the pin 34 and turning the said case in the proper direction.

Pivotally supported upon the bracket 27 by a screw 35 is an arm 36 having side wings 37 straddling the reel 1, and this arm extends to a distance beyond the bracket and is there formed into an eye 38 though which the flexible conductor 2 is passed. When the eye 38 is of metal it is, of course, protected by a suitable sleeve 39 of insulating material. When the flexible conductor is wound upon the reel 1 it will travel laterally with relation to the same in winding thereon and for this reason the eye 38 and arm 36 are movable about the pivot screw 35 so that the flexible conductor may wind smoothly upon the reel.

By making the collecting rings 5, 6, 14 and 15 with rabbeted engaging edges a broad conducting contact is provided, well adapted to carry heavy currents, and all springs and other such collecting devices, which are liable to break or get out of order, are thereby obviated. When the collecting rings are assembled they are protected from accidental contact by a surrounding insulating sleeve 40 which need only be confined between the contiguous faces of the reel 1 and disk 18. The disk 18 is held from rotative movement on the shaft 8 by means of a screw 41 passing through one of the arms 25 and engaging the disk 18, or any other suitable means may be used for the purpose.

I claim:—

1. In an electric fixture, a reel for the reception of a flexible conductor, terminal rings carried by said reel and provided with rabbeted edges, other terminal rings also provided with rabbeted edges intermeshing with the rabbeted edges of the terminal rings on the reel, means for coupling the flexible conductor to one set of terminal rings, and other means for connecting the other set of terminal rings to an exterior circuit.

2. In an electric fixture, a rotatable reel for the reception of a flexible conductor, concentric rings with rabbeted edges and insulated one from another and mounted upon the reel for rotation therewith, means for coupling the flexible conductor to the insulated ring mounted on the reel, and other insulated concentric rings having rabbeted edges intermeshing with the rabbeted edges of the first-named rings, said second-named concentric rings being held against rotation and having means for coupling them to the terminals of a power circuit.

3. An electric fixture comprising a fixed shaft, means for supporting said shaft and holding the same against rotation, a reel mounted for rotation upon the fixed shaft and adapted to receive a flexible conductor, current collecting devices for connecting the flexible conductor to an external circuit, a spring case carried by the shaft and confined between one of the arms and the contiguous face of the reel, and a pin connection between the reel and the spring case, the said spring case being held elastically against the reel to maintain engagement with the pin thereon.

4. In an electric fixture, a reel for carrying a flexible conductor, an actuating spring therefor, a case for the spring held in contact with the reel elastically, and a connection between the reel and the spring case maintained by the elastic tendency of the spring case.

5. In an electric fixture, a reel having a pin projecting from one face thereof, a spring tending to rotate the reel, and an elastic case interposed between the reel and spring and provided with a perforation in which the pin engages, the said case being movable against the tendency of its elasticity to disengage it from the pin.

6. An electric fixture comprising a reel for carrying a flexible conductor, a fixed shaft upon which the reel is rotatable, a spring fast at one end to the shaft, an elastic case to which the other end of the spring is attached, a coupling between the spring case and the reel, the spring case being movable against the tendency of its elasticity to uncouple it from the reel; spaced conducting rings on the reel having rabbeted edges and movable with the reel, and other spaced conducting rings having rabbeted edges matching the rabbeted edges of the rings on the reel and secured to a fixed portion of the structure.

7. An electric fixture comprising a reel for carrying a flexible conductor, a fixed shaft upon which the reel is rotatable, a spring fast at one end to the shaft, an elastic case to which the other end of the spring is attached, a coupling between the spring case and the reel, the spring case being movable against the tendency of its elasticity to uncouple it from the reel; spaced conducting rings on the reel having rabbeted edges and movable with the reel, other spaced conducting rings having rabbeted edges matching the rabbeted edges of the rings on the reel and secured to a fixed portion of the structure, a supporting bracket for the reel, and a guide on the bracket having wings embracing the edges of the reel and provided with an eye for the passage of the flexible conductor.

In testimony that I claim the foregoing as my own, I have hereto affixed my signature in the presence of witnesses.

HARRY TOOMEY HALL.

Witnesses:
 FRED M. KUHN,
 A. A. ROLAND,
 L. E. KERLIN.